United States Patent
Lee

(10) Patent No.: US 8,097,358 B2
(45) Date of Patent: Jan. 17, 2012

(54) CYLINDRICAL SECONDARY BATTERY

(75) Inventor: Jangho Lee, Yongin-si (KR)

(73) Assignee: Samsung SDI Co,,., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 934 days.

(21) Appl. No.: 11/987,539

(22) Filed: Nov. 30, 2007

(65) Prior Publication Data

US 2008/0131768 A1 Jun. 5, 2008

(30) Foreign Application Priority Data

Nov. 30, 2006 (KR) ........................ 10-2006-0120210

(51) Int. Cl.
*H01M 2/02* (2006.01)

(52) U.S. Cl. ........ 429/181; 429/130; 429/133; 429/163; 429/164; 429/171; 429/174; 429/185

(58) Field of Classification Search ................... 429/130, 429/133, 163, 164, 168, 169, 170, 174, 181, 429/185, 166, 171
See application file for complete search history.

(56) References Cited

U.S. PATENT DOCUMENTS

| 2003/0143459 A1* | 7/2003 | Kunimoto et al. | 429/158 |
| 2006/0068273 A1* | 3/2006 | Yoo | 429/82 |

FOREIGN PATENT DOCUMENTS

KR 1020050119674 A 12/2005

* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

A cylindrical rechargeable battery having an insulating gasket prevents an internal short circuit between a cylindrical can and a cap assembly generated by external factors. The cylindrical rechargeable battery includes an electrode assembly; a cylindrical can which has one open side and receives the electrode assembly through the open side, and is electrically connected to the received electrode assembly; and an insulating gasket which is connected to the inner surface of the open side of the cylindrical can and includes a bent cover part; and a cap assembly which seals the open side of the cylindrical can and is electrically insulated from the cylindrical can by the insulating gasket, and is electrically connected to the electrode assembly. The cover part covers an outer surface of the open side of the cylindrical can.

12 Claims, 4 Drawing Sheets

CYLINDRICAL SECONDARY BATTERY

CLAIM OF PRIORITY

This application makes reference to, incorporates the same herein, and claims all benefits accruing under 35 U.S.C. §119 from an application earlier filed in the Korean Intellectual Property Office on 30 Nov. 2007 and there duly assigned Serial No. 10-2006-0120210.

BACKGROUND OF THE INVENTION

1. Field of the Invention

The present invention relates to a cylindrical secondary battery, more particularly, to a secondary battery wherein an insulating gasket prevents an inner short circuit between a cylindrical can and a cap assembly thus further prevents an inner short circuit generated by external factors between a cylindrical can and a cap assembly.

2. Description of the Related Art

Recently, compact and lightweight electric/electronic apparatuses such as mobile phones, notebook computers, personal digital assistants (PDA), digital cameras have been developed and manufactured. Such portable electric/electronic apparatuses employ a battery pack in order to operate in the places where no external power supply is equipped, and the battery pack has at least one battery inside so as to output a predetermined voltage for driving portable electric/electronic apparatuses for a certain period of time.

The recent trend of battery pack is to employ a chargeable/dischargeable secondary battery which is economically advantageous. The secondary battery for the battery pack typically includes a nickel-cadmium battery, a nickel-hydrogen battery and a lithium rechargeable battery.

The lithium rechargeable battery has an operating voltage of 3.6V which is three times higher than the nickel-cadmium battery and the nickel-hydrogen battery which are widely used as power supplies for portable electric/electronic apparatuses. Because energy density per unit weight of the lithium rechargeable battery is high, its usage is expended.

The lithium rechargeable battery employs a lithium-based oxide as a positive electrode active material and a carbon material as a negative electrode active material. Generally, the lithium rechargeable battery can be classified into a liquid electrolyte battery and a polymer electrolyte battery according to different kinds of electrolytes. The lithium rechargeable battery using a liquid electrolyte is called as a lithium ion battery, and a lithium rechargeable battery using a polymer electrolyte is called as a lithium polymer battery. Furthermore, the lithium rechargeable battery may be formed in various shapes, and the typical shape is a cylindrical shape, a rectangular shape and a pouch shape.

The lithium rechargeable batteries which are formed in various shapes as stated above, the structure of a cylindrical lithium rechargeable battery will be briefly explained as follows. Hereinafter, the cylindrical lithium battery is referred to as the cylindrical rechargeable battery.

The cylindrical rechargeable battery includes a jelly-roll type electrode assembly, a cylindrical can receiving the electrode assembly, and a cap assembly connected to the open side of the cylindrical can.

The electrode assembly includes a positive electrode plate, a negative electrode plate, and a separator. A positive electrode plate and a negative electrode plate are stacked and a separator is interposed therebetween. The positive electrode, negative electrode plates and the separator are wound together in one direction thus the electrode assembly is formed in a jelly-roll type structure. A positive electrode tab and a negative electrode tab are attached to the positive electrode plate and the negative electrode plate respectively.

The cylindrical can receives the electrode assembly, and the electrode assembly has insulating plates mounted on the upper and lower part thereof respectively.

The cap assembly seals the open side of the cylindrical can, and the cap assembly includes a electrode cap, PTC (Positive Temperature Coefficient) elements, and a safety vent.

A gasket is mounted along the outer circumference of the cap assembly and the gasket insulates the cap assembly and the cylindrical can.

A ring type washer is mounted between the cylindrical can and the electrode cap to prevent a short circuit generated by external factors between the cylindrical can and the electrode cap. For example, when a conductive material having a thin thickness such as an electric wire is accidently inserted between the cylindrical can and the electrode cap, a short circuit of the battery occurs. The washer made of an electrical insulating material fills the gap between the cylindrical can and the electrode cap, thus prevents any electrical contact between the cylindrical can and the electrode cap Therefore, the washer made of an electrical insulating material is employed to mount between the cylindrical can and the electrode cap to prevent a short circuit generated by external factors between the cylindrical can and the electrode cap.

The washer is mounted between the cylindrical can and the electrode cap during the fabrication step of completing the cylindrical rechargeable battery, and the fabrication of the cylindrical rechargeable battery is completed by tubing the battery with the washer placed between the cylindrical can and the electrode cap.

The conventional cylindrical rechargeable battery described above, however, employs an additional washer to prevent possible external factor induced short circuit, so the fabricating process of the cylindrical battery becomes more complicated because an additional process is needed to insert the washer into the cap assembly of the cylindrical rechargeable battery or into the cylindrical can.

Further, because the washer is not integrally manufactured with the battery, the washer may move away from its original position during the usage of the cylindrical rechargeable battery. If the washer moves away from its original position, the washer may not efficiently cut off the cylindrical can from the cap assembly, thus a gap between the cylindrical can and the cap assembly is generated. Thin conductive materials may be accidently inserted into the gap from outside of the battery, thereby resulting in a short circuit of the battery.

SUMMARY OF THE INVENTION

It is, therefore, an object of the present invention to provide an improved secondary battery to eliminate the problems of the conventional design of the battery as stated above.

It is another object of the present invention to provide an improved secondary battery wherein an insulating gasket prevents an inner short circuit between a cylindrical can and a cap assembly and thus further prevents an inner short circuit generated by external factors between a cylindrical can and a cap assembly.

The present invention has been contrived to solve the aforementioned problems. One aspect of the present invention is to prevent a short circuit generated by external factors between a cap assembly and a can without introducing an additional insulating material such as the washer, thereby simplifying the fabricating process of the cylindrical rechargeable battery and reducing fabricating costs.

To accomplish these and other aspects, the present invention provides a cylindrical rechargeable battery which includes an chargeable/dischargeable electrode assembly, a cylindrical can which has one side open and receives the electrode assembly through the open side and is electrically connected to one electrode of the received electrode assembly, an insulating gasket including a cover part which is connected and bent towards the inner surface of the open side of the cylindrical can and covers the outer surface of the open side of the cylindrical can, a cap assembly which seals the open side of the cylindrical can in a state of being insulated from the cylindrical can by using the insulating gasket and is electrically connected to another electrode of the electrode assembly.

The cover part of the gasket may bend from its mother body; the insulating gasket for its inner surface to be contacted to the outer surface of the open side of the cylindrical can, therefore the cross-section which is cut out in the height direction of the cylindrical can may form a hook shape with the open side of the insulating gasket, thereby covering the rim of the neck which terminates the open side of the cylindrical can.

The insulating gasket may be a round shape, and the round portion may have a thinner thickness compared with other portions of the cover part and the insulating gasket.

DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED INVENTION

Hereinafter, exemplary embodiments of the present invention will be described with reference to the accompanying drawings.

Figure 1:
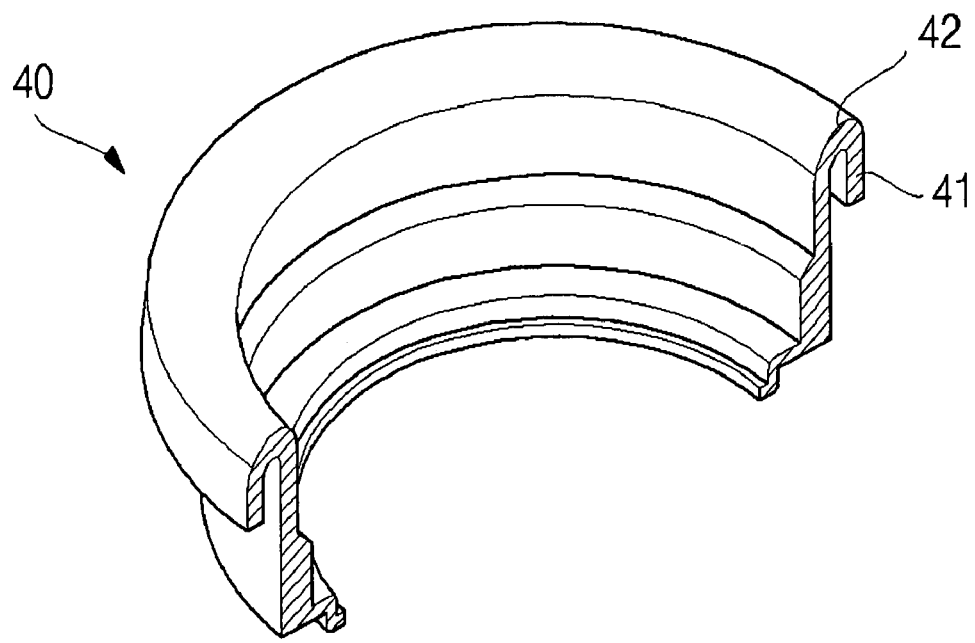
FIG. 1 is a perspective view illustrating an insulating gasket according to one exemplary embodiment of the present invention.
Figure 2:
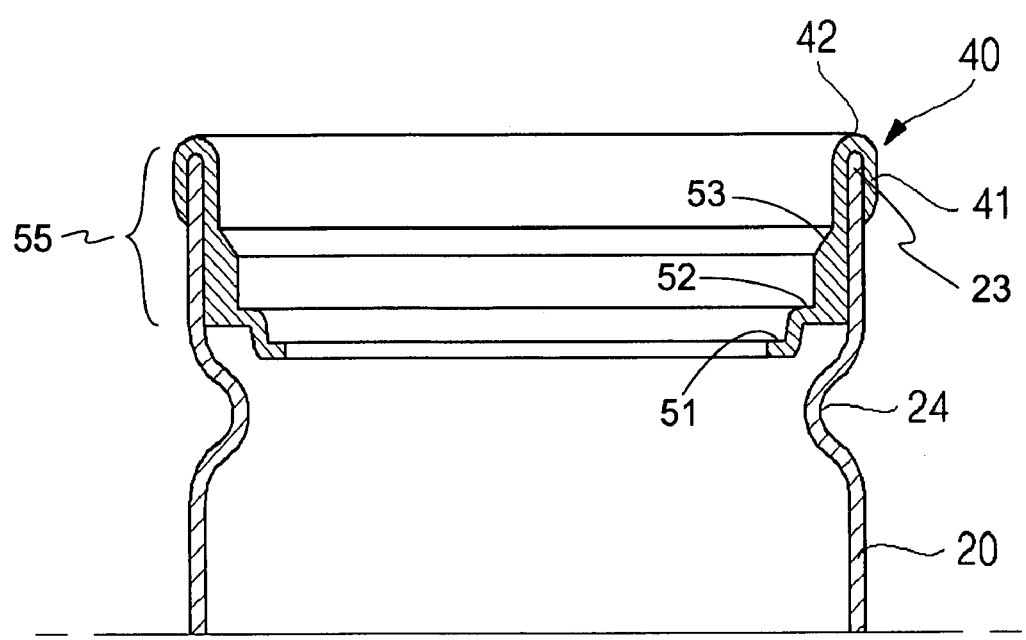
FIG. 2 is a cross-sectional view illustrating the state in which the insulating gasket according to the embodiment of FIG. 1 is connected to a can of a cylindrical rechargeable battery.
Figure 3:
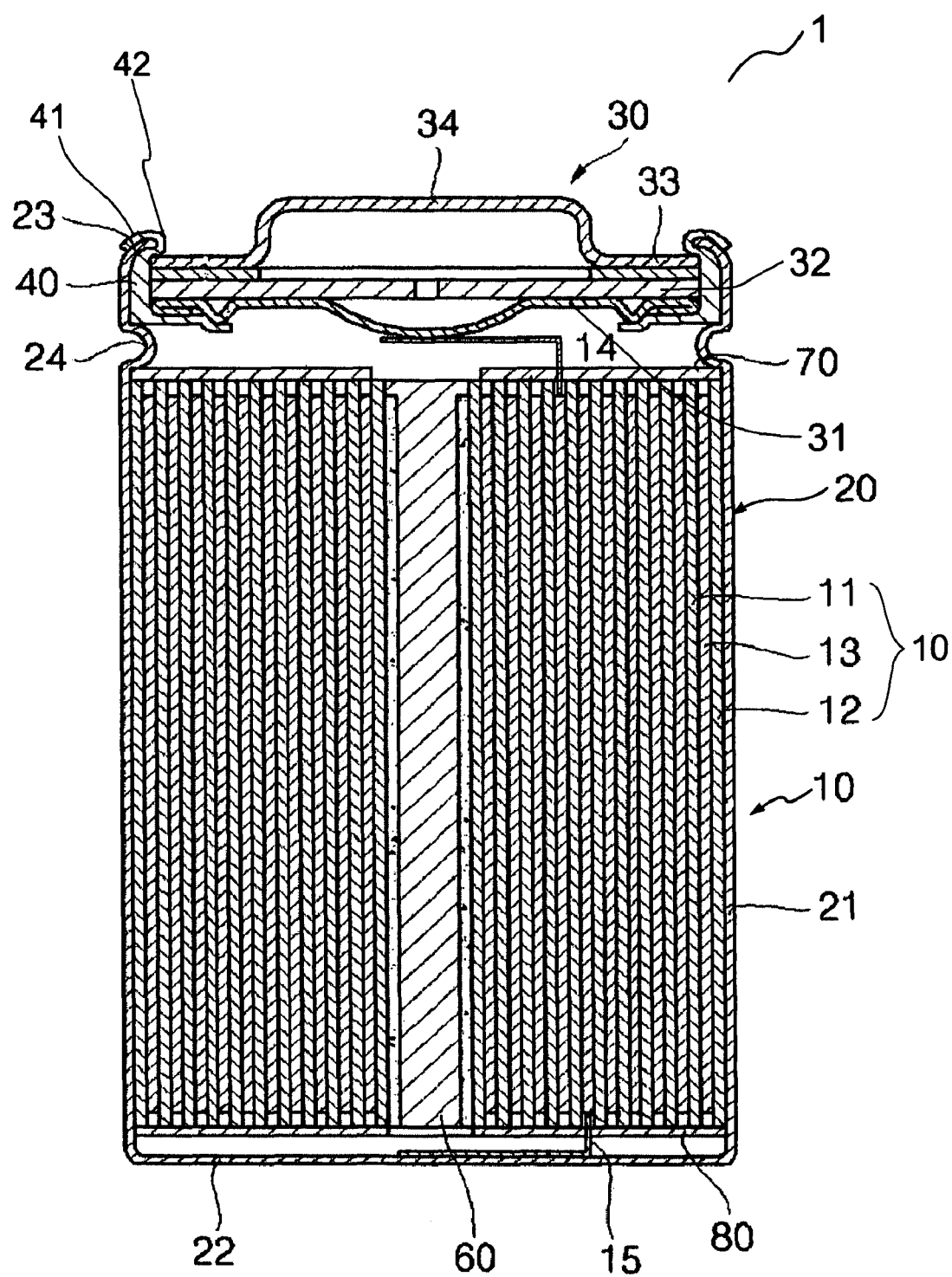
FIG. 3 is a cross-sectional view illustrating the entire composition of the cylindrical rechargeable battery to which the insulating gasket according to the embodiments of FIGS. 1 and 2 is applied.
Figure 3A:
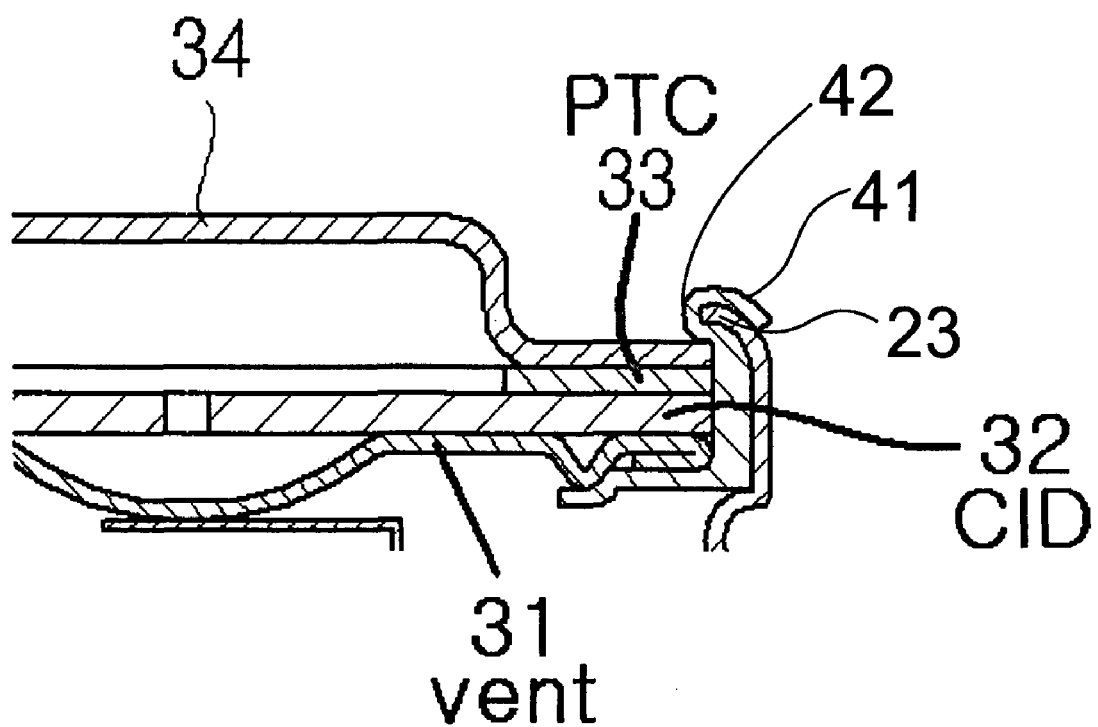
FIG. 3A is a sectional cross-sectional view illustrating the upper portion of the cylindrical rechargeable battery to which the insulating gasket according to the embodiments of FIGS. 1 and 2 is applied.

FIG. 1 is a perspective view illustrating an insulating gasket according to one exemplary embodiment of the present invention, and FIG. 2 is a cross-sectional view illustrating the state which the insulating gasket according to the embodiment of FIG. 1 is connected to the can of a cylindrical rechargeable battery, and FIG. 3 is a cross-sectional view illustrating the entire composition of the cylindrical rechargeable battery to which the insulating gasket according to the embodiments of FIGS. 1 and 2 is applied. FIG. 3A is a sectional cross-sectional view illustrating the upper portion of the cylindrical rechargeable battery to which the insulating gasket according to the embodiments of FIGS. 1 and 2 is applied.

As illustrated in FIG. 3 and FIG. 3A, a cylindrical rechargeable battery 1 according to one exemplary embodiment of the present invention includes an electrode assembly 10, a cylindrical can 20, a cap assembly 30, an insulating gasket 40, an electrolyte, a clipping portion, or rim, 23, a current interrupt device (CID) 32 and a center pin 60.

An electrode assembly 10 includes a positive electrode plate 11 on which positive electrode active materials are coated, a negative electrode plate 12 on which negative electrode active materials are coated, a separator 13 interposed between positive electrode plate 11 and negative electrode plate 12 to prevent a short circuit between the two electrode plates while only allowing lithium ions to get through between the two electrode plates. Positive electrode plate 11, negative electrode plate 12 and separator 13 are wound in an approximate round shape thus electrode assembly 10 is formed in a jelly-roll shape. Further, a positive electrode tab 14 and a negative electrode tab 15 are attached to positive electrode plate 11 and negative electrode plate 12 respectively. Positive electrode tab 14 attached to positive electrode plate 11 is generally formed of aluminum, and negative electrode tab 15 attached to negative electrode plate 12 is generally formed of nickel. Materials for positive electrode tab 14 and negative electrode tab 15 are not limited hereto.

Cylindrical can 20 having one side open has a space to receive electrode assembly 10, and is normally formed of aluminum (Al) or iron (Fe). Cylindrical can 20 includes a side plate 21 whose cross-section is a round shape and hollow, and a lower plate 22 which seals the bottom of cylindrical can 20. The upper part of the side plate 21 is the open side for receiving electrode assembly 10. One of positive electrode tab 14 and negative electrode tab 15 is attached to the center of lower plate 22 of cylindrical can 20, therefore cylindrical can 20 has the same electrical polarity as the electrode tab attached. Negative electrode tab 15 of electrode assembly 10 is generally attached to cylindrical can 20; therefore cylindrical can 20 performs as a negative terminal which has the same electrical polarity as negative electrode plate 12. An upper insulating plate 70 and a lower insulating plate 80 are mounted on the upper and the lower part of electrode assembly 10. A clipping portion, or rim, 23 is formed at the upper edge of side plate 21 of can 20. As shown in FIG. 3, the combination of clipping portion, rim 23, cover part 41 and round portion 42 fix the cap assembly 30 to can 20 by pressing against an upper part of cap assembly 30.

Cap assembly 30 covers the open side of cylindrical can 20 and separates inner of the can from outside. In other words, cap assembly 30 cuts off the upper portion of side plate 21 from outside. Cap assembly 30 includes a conductive safety vent 31, current interrupt device (CID) 32, a Positive Temperature Coefficient (PTC) element 33, and a conductive positive electrode cap 34. Conductive safety vent 31 inverts its shape when the battery is over-charged or generates abnormal heat. One of positive and negative electrode tabs 14 and 15 is electrically and mechanically connected to safety vent 31. Generally positive electrode tab 14 is attached to safety vent 31, therefore cap assembly 30 performs as a positive terminal which has the same electrical polarity as positive electrode plate 11. Current interrupt device (CID) 32 is electrically and mechanically connected to the upper part of conductive safety vent 31. A circuit pattern of current interrupt device (CID) 32 breaks down when conductive safety vent 31 inverts its shape. Positive Temperature Coefficient (PTC) element 33 is electrically and mechanically connected to the upper part of current interrupt device (CID) 32. The resistance of PTC element 33 dramatically increases when the battery is over-charged or the battery generates abnormal heat because of an internal short circuit, thereby cutting off the inner short circuit of the battery. Conductive positive electrode cap 34 is electrically and mechanically connected to the upper part of PTC element 33 and can apply electrical current to an external device. Positive Temperature Coefficient (PTC) element 33 is arranged between positive electrode cap 34 and current interrupt device (CID) 32.

Insulating gasket 40 is mounted between the inner surface of cylindrical can 20 and cap assembly 30 to insulate cylindrical can 20 and cap assembly 30. Insulating gasket 40 is mounted surrounding the sides of cap assembly 30, that is, a conductive safety vent 31, current interrupt device (CID) 32, Positive Temperature Coefficient (PTC) 33, and conductive positive electrode cap 34 in the circumferential direction.

Insulating gasket 40 includes a cover part 41 which is bent to cover the outer surface of the open side of cylindrical can 20, that is, the upper outer surface of side plate 21. Cover part 41 5 prevents external conductive materials inserted between side plate 21 and cap assembly 30, therefore an short circuit between cylindrical can 20 and cap assembly 30 may not occur due to external factors. Here, the upper part of side plate 21 refers to the upper portion of side plate 21 in the direction of the open side of cylindrical can 20 as illustrated in FIG. 3.

Cover part 41 bends from the upper part of insulating gasket 40 towards the outside of cylindrical can 20. The size of cover part 41 is large enough to prevent positive electrode cap 34 from being connected to cylindrical can 20 even though the external conductive materials are introduced into a region near the end portion of the side plate in the direction of the open side of cylindrical can 20.

Cover part 41 and a part of insulating gasket 40 which is the mother body, or main body of the cover part together forms a hook structure, and the hook structure may couple to and cover the open side of cylindrical can 20. The mother body or main body refers to the potions of gasket 40 other than round portion 42 and cover part 41. Cover part 41 bends from upper portion of insulating gasket 40 and the inner surface of cover part 41 contacts the outer surface of cylindrical can 20. Here, the width of gap between the inner surface of bent cover part 41 and the outer surface of insulating gasket 40 may be equal to or smaller than the thickness of the open side of cylindrical can 20. The hook structure of insulating gasket 40, which is formed by cover part 41 and the mother body of cover part 41, covers the upper side of cylindrical can 20, and insulating gasket 40 is inserted into the open side of cylindrical can 20, thereby maintaining a strongly combined status. The structure allows insulating gasket 40 to strongly connect to cylindrical can 20, and prevents external interference which may be generated by cover part 41. This structure may further prevent disturbances from external contacts and collisions of cover part 41, thereby safely covering the open side of cylindrical can 20.

A coupling portion formed by cover part 41 and the mother body of cover part 41 may have a rounded shape and the coupling portion may be indicated by a round portion 42. Referring to FIG. 1, because cover part 41 is connected to the mother body of cover part 41 in a round shape. Cover part 41 may be folded more gently from main body of cover part 41 with a coupling portion having rounded shape than with a coupling portion having a square shape. Therefore crimping and tubing cylindrical can 20 may be performed without a hitch.

As shown in FIG. 1 and FIG. 2, the insulating gasket has three peripheral regions disposed to hold a cap assembly of the cylindrical rechargeable battery within a neck of the open top and with a hooked-shaped peripheral region, a first peripheral region 51 of the gasket having a first predetermined height, first peripheral region 51 housed in the can; a second peripheral region 52 of the gasket having a second predetermined height longer than the first predetermined height, second peripheral region 52 housed in the can, the second peripheral region immediately adjoining first peripheral region 51 and formed toward the open top of the can; a third peripheral region 53 having a third predetermined height longer than second peripheral region 52, third peripheral region 53 housed in the can, immediately adjoining second peripheral region 52 and formed farther toward the open top of the can than second peripheral region 52; and the hooked-shaped peripheral region formed immediately adjoining third peripheral region 53, and positioned to embrace both an interior surface and an exterior surface of the upper portion of the cylindrical can. Different peripheral region of different predetermined heights are formed to hold corresponding components of cap assembly 30, because the components of cap assembly 30 (i.e. conductive safety vent 31, current interrupt device (CID) 32, Positive Temperature Coefficient (PTC) element 33, and conductive positive electrode cap 34) may have different geometries and different dimensions. A neck 55 refers to a region of upper terminal portion of can 20 and is formed above and immediately adjoining concave beading portion 24.

Figure 4:
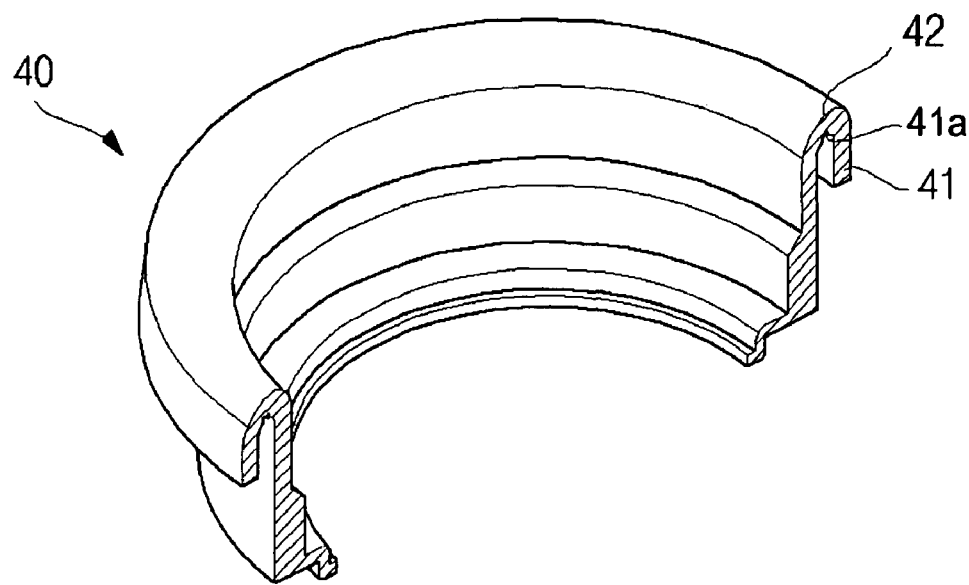
FIG. 4 is perspective view illustrating the insulating gasket according to another exemplary embodiment of the present invention.
Figure 5:
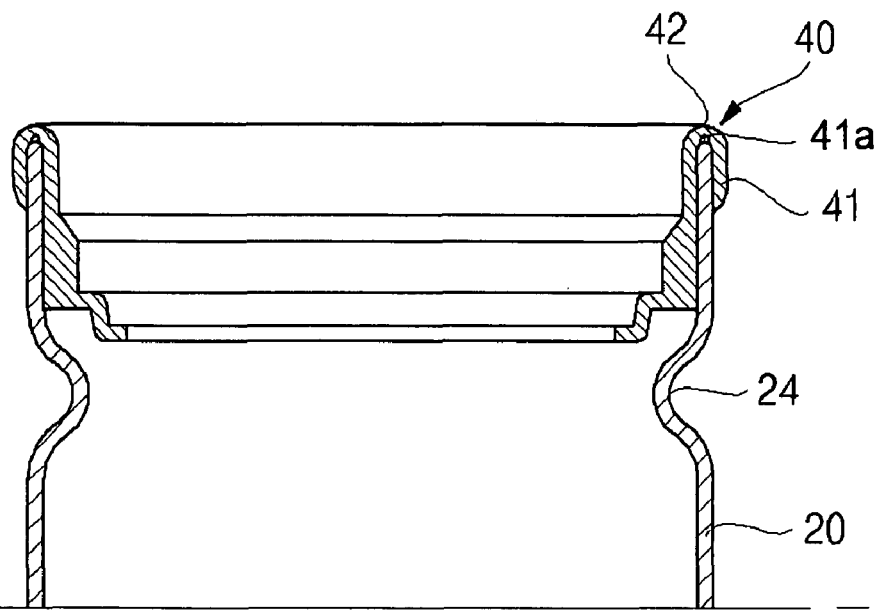
FIG. 5 is a cross-sectional view illustrating the state in which the insulating gasket according to the embodiment of FIG. 4 is connected to the cylindrical rechargeable can.

Referring to FIGS. 4 and 5, since round portion 42 of cover part 41 has a thinner thickness than other portions of cover part 41 and insulating gasket 40, cover part 41 may be flexible in response to external forces.

A recess 41*a* is formed in sequence along the periphery of round portion 42 thus round portion 42 of cover part 41 has a relatively thin thickness than other portions, therefore cover part 41 is flexible to external forces. As a result, cover part 41 can be closely attached to and inserted into the open side of cylindrical can 20 without a hitch, and the tubing process can be easily performed because cover part 41 is closely attached to the outer surface of cylindrical can 20.

An electrolyte (not shown in figures) carries lithium ions which are generated from positive electrode plate 11 and negative electrode plate 12 by an electrochemical reaction during the charging and discharging of the battery. The electrolyte may be a non-aquatic organic electrolyte which is a mixture of lithium salts and high purity organic solvents, and may be a polymer employing a polyelectrolyte. The material of the electrolyte is not limited hereto.

Center pin 60 is inserted into the center of electrode assembly 10 and center pin 60 connects negative electrode tab 15 to lower plate 22 of cylindrical can 20 by applying forces to negative electrode tab 15 when one of electrode tabs of the electrode assembly 10 is welded to the center of lower plate 22. In this exemplary embodiment, negative electrode tab 15 of electrode assembly 10 is welded to the center of lower plate 22 of the cylindrical can 20. And, center pin 60 which is inserted into the center space of electrode assembly 10, prevents electrode assembly 100 from being loosened.

Referring to FIG. 3, a brief assembly process of cylindrical rechargeable battery 1 may be performed when: electrode assembly 10 is received by cylindrical can 20; negative electrode tab 15 of electrode assembly 10 is welded and attached to lower plate 22 of cylindrical can 20 by center pin 60; a concave beading portion 24 of cylindrical can 20 is formed immediately above the bare cell, and prevents electrode assembly 10 from being separated from can 20; and an electrolyte (not shown in figures) is inserted into cylindrical can 20.

Then, after crimping and beading the upper part of cylindrical can 20, insulating gasket 40 is inserted into the upper portion of cylindrical can 20 on which crimping and beading are performed. Here, insulating gasket 40 is inserted into the cylindrical can in a state that cover part 41 covers the open side of cylindrical can 20, and cap assembly 30 is connected to one of the electrode tabs and fixed on the top of insulating gasket 40, therefore cylindrical rechargeable battery 1 is completed. Finally, a tubing process is performed.

Insulating gasket 40 of cylindrical rechargeable battery I prevents occurrence of an internal short circuit of cylindrical can 20 and cap assembly 30, and also prevents an external short circuit which may be generated between cylindrical can 20 and cap assembly 30 when external conductive materials are accidentally inserted therebetween. In particular, the structure which can prevents an external short circuit of cylindrical can 20 and cap assembly 30 is formed by employing insulating gasket 40 and insulating gasket 40 is placed between cylindrical can 20 and cap assembly 30. Therefore the ability of preventing an external short circuit of the rechargeable battery with the structure described above is very good.

According to the exemplary embodiments described above, in the cylindrical rechargeable battery of the present invention, the structure of the cylindrical rechargeable battery itself prevents a short circuit generated by external factors without introducing an additional insulating component such as a washer, thereby simplifying the fabricating process of the cylindrical rechargeable battery and reducing fabricating costs.

The structure is to prevent a short circuit induced by external factors between the cylindrical rechargeable battery can and the cap assembly. In the structure, the insulating gasket which is mounted between the can and the cap assembly prevents a short circuit generated by external factors between the can and the cap assembly, thereby improving the stability of the cylindrical rechargeable battery.

What is claimed is:

1. A cylindrical rechargeable battery, comprising:
   an electrode assembly which is rechargeable and dischargeable;
   a cylindrical can which has one open side and receives the electrode assembly through the open side and is electrically connected to one electrode of the received electrode assembly;
   a continuous insulating gasket which has a bent cover part physically contacting the inner surface of the open side of the cylindrical can, said cover part continuously from the inner surface of the cylindrical can and beyond a peripheral rim of the open side of the cylindrical can and covering an outer surface of the open side of the cylindrical can; and
   a cap assembly electrically connected to another electrode of the electrode assembly and sealing the open side of the cylindrical can and insulating from the cylindrical can by the insulating gasket.

2. The cylindrical rechargeable battery of claim 1, wherein the cover part may bend from the top portion of the insulating gasket towards outside of the battery, the cover part and a part of the insulating gasket which is the mother body of the cover part form a hook shape cross-section cut out in the height direction of the cylindrical, and said insulating gasket covers the open side of the cylindrical can.

3. The cylindrical rechargeable battery of claim 2, wherein a gap between an inner surface of the bent cover part and outer surface of the insulating gasket forms a space to insert the hook shape in the gap, and the gap may be equal to or smaller than the thickness of the open side of the cylindrical can.

4. The cylindrical rechargeable battery of claim 1, wherein the coupling portion of the cover part and the insulating gasket has a round shape.

5. The cylindrical rechargeable battery of claim 4, wherein the round portion has a thinner thickness than other parts of the cover part and the insulating gasket.

6. A cylindrical rechargeable battery, comprising:
   a can having an open top disposed to receive an electrode assembly of the battery;
   an electrically insulating gasket comprising a cover part bending around a rim of the open top of the can, the cover art encasing the rim, the electrical insulating gasket being integrally formed simultaneously together as a monolithic unit;
   said cover part and a mother body of said cover part which is a part of the insulating gasket forming a hooked shape cross-sectional shape cut-out in a direction normal to the open top; and
   said insulating gasket covering the open top of the cylindrical can.

7. The cylindrical rechargeable battery of claim 6, with the insulating gasket having three peripheral regions disposed to hold a cap assembly of the cylindrical rechargeable battery within a neck of the open top and with a hooked-shaped periphery,
   a first periphery of the gasket having a first predetermined height, said first periphery housed in the can;
   a second periphery of the gasket having a second predetermined height longer than the first predetermined height, said second periphery housed in the can, said second periphery immediately adjoining to said first periphery and formed toward the open top of the can;
   a third periphery having a third predetermined height longer than the second periphery, said third periphery housed in the can, immediately adjoining to said second periphery and formed farther toward the open top of the can than said second periphery; and
   said hooked-shaped periphery formed immediately adjoining to said third periphery, and formed embracing both an interior surface and an exterior surface of the upper portion of said cylindrical can.

8. The cylindrical rechargeable battery of claim 6, with a round portion of the cover part having a thinner thickness than other parts of the cover part and other parts of the insulating gasket, said round portion forming a junction of the cover part and the mother body of said cover part which is a part of the insulating gasket, said round portion spaced-apart from the upper portion of said cylindrical can.

9. The cylindrical rechargeable battery of claim 6, with a clipping portion formed by the upper portion of a side plate of said cylindrical can,
   said clipping portion bent inwardly around its periphery toward a center of the open top, and
   both an interior surface and an exterior surface of said clipping portion embraced by said hooked shape.

10. A cylindrical rechargeable battery, comprising:
    a clipping portion formed by the upper portion of a side plate of said cylindrical can, the clipping portion disposed to attach a cap assembly of the battery to a cylindrical can pressed against an upper part of the cap assembly;

a beading portion formed in an upper portion of said cylindrical can for preventing an electrode assembly of said battery from being separated from said cylindrical can; and a continuous electrically insulating gasket terminated by a hooked-shaped periphery encasing the clipping portion by embracing both an interior surface and an exterior surface of the upper portion of said cylindrical can immediately adjoining said clipping portion.

11. The cylindrical rechargeable battery of claim 10, with the insulating gasket having three peripheral regions disposed to hold a cap assembly of the cylindrical rechargeable battery within a neck of the open top and with a hooked-shaped periphery, a first periphery of the gasket having a first predetermined height, said first periphery housed in the can;

a second periphery of the gasket having a second predetermined height longer than the first predetermined height, said second periphery housed in the can, said second periphery immediately adjoining to said first periphery and formed toward the open top of the can;

a third periphery having a third predetermined height longer than the second periphery, said third periphery housed in the can, immediately adjoining to said second periphery and formed farther toward the open top of the can than said second periphery; and said hooked-shaped periphery formed immediately adjoining to said third periphery, and formed embracing both an interior surface and an exterior surface of the upper portion of said cylindrical can.

12. The cylindrical rechargeable battery of claim 10, with a round portion of the cover part having a thinner thickness than other parts of the cover part and other parts of the insulating gasket, said round portion forming a junction of the cover part and the mother body of said cover part which is a part of the insulating gasket, said round portion spaced-apart from the upper portion of said cylindrical can.

* * * * *